United States Patent
Sax et al.

(10) Patent No.: US 9,081,870 B2
(45) Date of Patent: Jul. 14, 2015

(54) STREAMING SYSTEM PERFORMANCE OPTIMIZATION

(71) Applicant: Hewlett-Packard Development Company, L.P., Houston, TX (US)

(72) Inventors: Matthias Sax, Berlin (DE); Maria G. Castellanos, Sunnyvale, CA (US); Meichun Hsu, Los Altos Hills, CA (US); Qiming Chen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 13/705,952

(22) Filed: Dec. 5, 2012

(65) Prior Publication Data

US 2014/0156707 A1 Jun. 5, 2014

(51) Int. Cl.
*G06F 17/30* (2006.01)

(52) U.S. Cl.
CPC ............................ *G06F 17/30958* (2013.01)

(58) Field of Classification Search
CPC ............................................... G06F 17/30958
USPC ........................................................ 707/798
See application file for complete search history.

(56) References Cited

U.S. PATENT DOCUMENTS

| | | | |
|---|---|---|---|
| 7,103,590 B1* | 9/2006 | Murthy et al. | 1/1 |
| 7,720,841 B2 | 5/2010 | Gu et al. | |
| 8,069,374 B2 | 11/2011 | Panigraphy et al. | |
| 8,775,341 B1* | 7/2014 | Commons | 706/20 |
| 2006/0218123 A1* | 9/2006 | Chowdhuri et al. | 707/2 |
| 2008/0172674 A1* | 7/2008 | Yee et al. | 718/106 |
| 2009/0172674 A1* | 7/2009 | Bobak et al. | 718/101 |
| 2009/0225082 A1* | 9/2009 | Hargrove et al. | 345/440 |
| 2011/0209149 A1* | 8/2011 | Simitsis et al. | 718/100 |
| 2011/0295939 A1 | 12/2011 | Andrade et al. | |
| 2012/0137018 A1 | 5/2012 | Uhlig et al. | |
| 2012/0151190 A1* | 6/2012 | Usuba | 712/220 |
| 2013/0346988 A1* | 12/2013 | Bruno et al. | 718/102 |

OTHER PUBLICATIONS

"The Linear Road Website," <http://www.cs.brandeis.edu/~linear-road/>. Download Date: Dec. 5, 2012.
Liew, C.S. et al, "Towards Optimising Distributed Data Streaming Graphs Using Parallel Streams", Jun. 20-25, 2010.
Lohrmann, Björn, et al., "Massively-parallel stream processing under QoS constraints with Nephele," in Proc. of the 21st International Symposium on High-Performance Parallel and Distributed Computing, ser. HPDC '12: Jun. 22, 2012.
N. Marz, "Storm: Distributed and fault-tolerant realtime computation," Download Date:Dec. 5, 2012, <http://storm-project.net/>.
Neumeyer, Leonardo, et al., "S4: Distributed Stream Computing Platform," in ICDM Workshops, 2010.

(Continued)

*Primary Examiner* — Joshua Bullock

(74) *Attorney, Agent, or Firm* — Mannava & Kang, P.C.

(57) ABSTRACT

According to an example, a dataflow directed acyclic graph including nodes and edges connecting the nodes. Parameters for the nodes are calculated, and the parameters may include batch size and a degree of parallelism.

13 Claims, 5 Drawing Sheets

(56) References Cited

OTHER PUBLICATIONS

Peng, Daniel, et al., "Large-scale Incremental Processing Using Distributed Transactions and Notifications", Google, Inc.; in 9th USENIX Symposium on Operating Systems Design and Implementation. 2010.

The Apache Software Foundation, "Hadoop," http://hadoop.apache.org/, Dec. 2, 2012.

\* cited by examiner

```
    P ← all source nodes
    while P is not empty do
        ⎧ for all p ∈ P do
        ⎪     if input latency is smaller than processing time then
        ⎪         b ← calculate batch size to reduce shipping time
        ⎪         if b > B_max then b = B_max
   401 ⎨             increase dop of p to increase l_i
        ⎪         end if
        ⎪     end if
        ⎪     calculate output rate r_o
        ⎩ end for
        ⎧ C ← all unprocessed nodes with known input rate
        ⎪ for all c ∈ C do
   402 ⎨     dop_c ← calculate dop such that l_i < ppt
        ⎩ end for
   403 ⎯ P ← all c ∈ C with outgoing edges
       end while
```

FIG. 4

STREAMING SYSTEM PERFORMANCE OPTIMIZATION

BACKGROUND

Use of streaming systems has grown given the popularity of applications that require processing of large amounts of data in real-time or near-real-time. For example, search engines and social media applications are using streaming systems to process large numbers of queries and messages in real-time. Typically, the streaming systems include distributed computer processing platforms to process the data in a real-time manner.

BRIEF DESCRIPTION OF DRAWINGS

The embodiments are described in detail in the following description with reference to examples shown in the following figures.

FIG. 4 illustrates calculating parameters according to an optimization function.

DETAILED DESCRIPTION OF EMBODIMENTS

Figure 1:
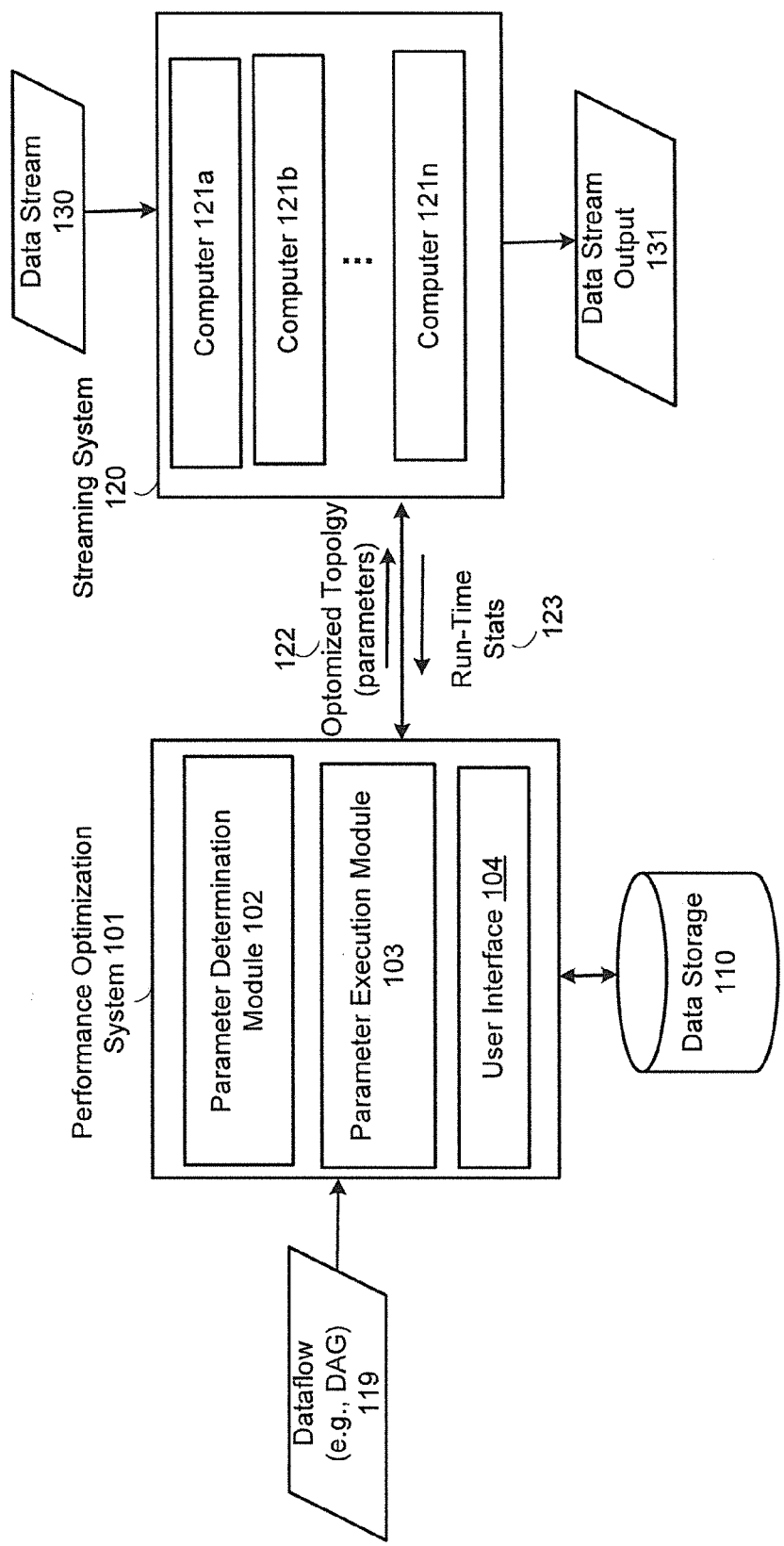
FIG. 1 illustrates a system.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a performance optimization system for a streaming system determines parameters for a streaming system. The parameters may be selected to reduce latency for data processing performed by the streaming system. A streaming system for example processes large volumes of data using a distributed computing platform. For example, a search engine may use a streaming system to process thousands of queries per second, or a social media application may use a streaming system to process messages from millions of users in a very short period of time. Examples of existing streaming systems include Twitter™ Storm, Yahoo!™ S4, and Google™ Percolator. A streaming system may execute dataflows in the form of directed acyclic graphs (DAGs). A dataflow comprises data to be processed by the streaming system. The dataflow is modeled as a DAG comprising nodes and edges. T Examples of the parameters that are determined by the performance optimization system include batch size and degree of parallelism (dop). The batch size may indicate the number of tuples sent at one time to a processing node in a DAG for a dataflow. The dop may indicate how many operations can be simultaneously executed by a computer system in the streaming system. The dop can be used for multi-core systems. For example, a program running on the computer system may utilize a different number of processors or cores at different times. For each time period, the number of processors used to execute the program is the dop in one example.

The parameters determined by the performance optimization system may be determined to minimize processing time of dataflows in the streaming system. For example, the streaming system receives a dataflow in the form of a DAG and information regarding hardware parameters of the distributed computer systems in the streaming system that are executing the dataflows. The hardware parameters may be associated with CPU speed, memory, network bandwidth, etc. (e.g., central processing unit (CPU) clock speed, network bit rates, etc.).

Utilizing the DAG and the hardware parameters as inputs, the performance optimization system may determine for which nodes in the dataflow that batching is beneficial, and the optimum batch sizes for the nodes. The performance optimization system may also compute an optimal dop for each node in the DAG.

A streaming system 120 comprises distributed computer systems that can process data streams according to dataflows. Data stream 130 is shown as an input to the streaming system 120. In one example, the data stream 130 comprises a continuous stream of data and nodes in the DAG that are executed by the streaming system 120 process the data stream 130 and output the data stream output 131 as a result of the processing. The distributed computer systems for example include multicore CPUs that can perform parallel processing, such as instruction pipelining. A distributed computer system is shown as computers 121*a-n* which may be in a cluster and may include multicore CPUs. For example, a cluster may comprise one or more machines (e.g., servers), and each machine may include multicore CPUs. The clusters may comprise server clusters.

The performance optimization system 101 receives dataflows, including the dataflow 119, that are optimized by the performance optimization system 101 and provided to the streaming system 120. Dataflows may be built through user interface 104 as further described below. A dataflow is a computational model representing processing elements and how they are connected to process and exchange data (e.g., tuples) for processing data streams. A dataflow may represent a stream processing application, and the processing elements in the dataflow may include operators for the application. The processing elements, which may include operators for the stream processing application, may comprise machine readable instructions that execute on a processor to perform a particular function, such as a particular arithmetic function. The processing elements may generate output streams that are sent to other processing elements. For example, an operator receives tuples comprising data from a source operator, and process the tuples to generate output tuples which are sent to another operator for processing.

The dataflows to be optimized by the performance optimization system 101 for example are in the form of DAGs. The DAG for a dataflow comprises nodes that represent the processing elements of the dataflow. Edges in the DAG connect the nodes, and each edge includes one or more tuples. The nodes receive data from their input flows from producer nodes (referred to as producers), process the data and push the results to their output(s), which are consumer nodes (referred to as consumers). Once a DAG is executed in the streaming system 120, the nodes begin reading and processing data and sending their results to downstream consumers. Each node may operate in parallel resulting in pipeline parallelism. Also, each node can be executed with multiple parallel instances (tasks).

A parameter determination module 102 optimizes DAGs representing dataflows. The optimization may include calculating parameters for the nodes in the DAGs to minimize latencies in processing. For example, a DAG comprises nodes and edges connecting the nodes, wherein the nodes process tuples and the edges send tuples from one node (e.g., producer) to another node (e.g., consumer). Parameters for the nodes are calculated to minimize average latency for the tuples. Examples of the parameters include batch size and dop. The optimization is described in further detail below. A parameter execution module 103 provides the optimized DAG for a dataflow, including the calculated parameters, to the streaming system 120, where it is implemented and can be executed in one or more computers 121a-n which may be in a cluster. Providing an optimized DAG to the streaming system 120 is shown as optimized topology 122, which may include parameters for the nodes, sent to the streaming system 120.

The user interface 104 may be used to create or modify DAGs for dataflows and to monitor dataflows executed by the streaming system 120. The user interface 104 may be a graphical user interface, such as a web user interface. The performance optimization system 101 may receive run-time statistics 123 from the streaming system 120 executing a dataflow and the run-time statistics 123 may be displayed in the user interface 104. Examples of the run-time statistics 123 are described below. Data storage 110 may include a database hosted by a database server or another type of data storage system. The data storage 110 may store any data used by the performance optimization system 101.

Figure 2A:
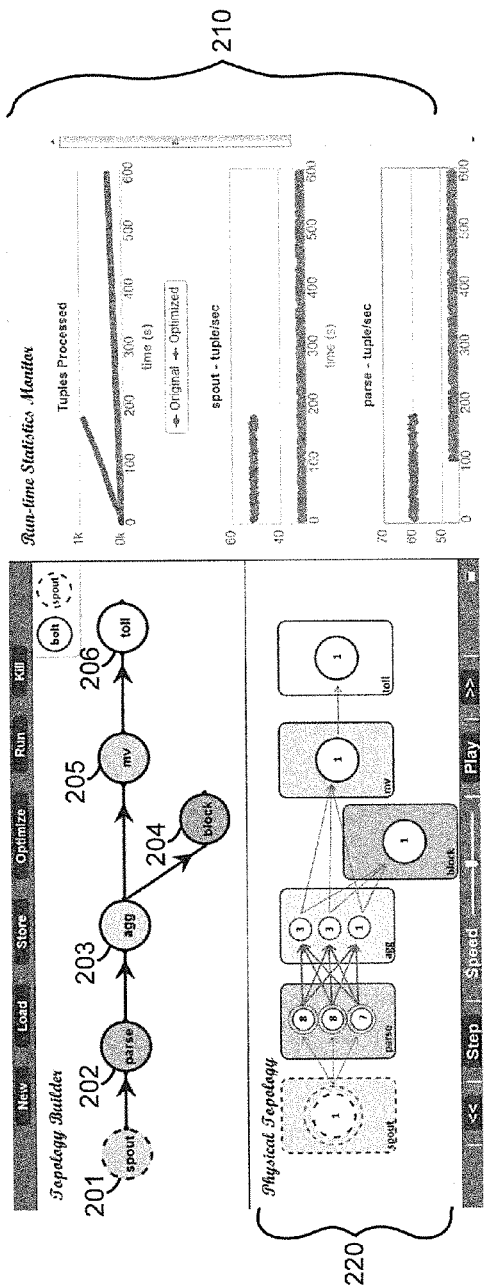
FIGS. 2A-B illustrates examples of user interface screens.

FIG. 2A shows an example of a screenshot for the user interface 104. An example of a DAG for the dataflow 119 is shown. The DAG includes nodes 201-206. The nodes represent operators that for example operate on a stream of data, such as a stream of tweets or a stream of other types of messages or data. For example, node 202 parses incoming tuples according to rules, node 203 aggregates tuples, and so on. Predefined spout and bolt operators can be used for simulations. The spouts/bolts do not perform any useful work but simulate pure processing time by sleeping. The user can parameterize each spout/bolt in the topology individually by providing values for simulated processing time or average output tuple size.

The user interface 104 may perform live monitoring by receiving run-time statistics 123 about the execution of the DAG (e.g., number of emitted tuples, average tuple size, current network utilization, etc.) from the streaming system 120. For example, an optimized DAG and the non-optimized DAG may be submitted and executed by the streaming system 120 for comparison. Both topologies get monitored at the same time and corresponding statistics are provided to the performance optimization system 101. This is shown in FIG. 2A in each of the charts shown in section 210. Therefore, the execution of both topologies can be compared with each other to show the advantages of the optimized DAG. The user interface 104 may also show the physical topology (e.g., all parallel tasks and all network connections) in the left lower window 220 during execution. The physical topology view displays more details about the execution, such as average batch buffer utilization and network load for an individual connection. The physical topology can be displayed complete or in an more compact visualization. The compact visualization is useful if the dops are high, resulting in too many details for the fully physical view.

Figure 2B:
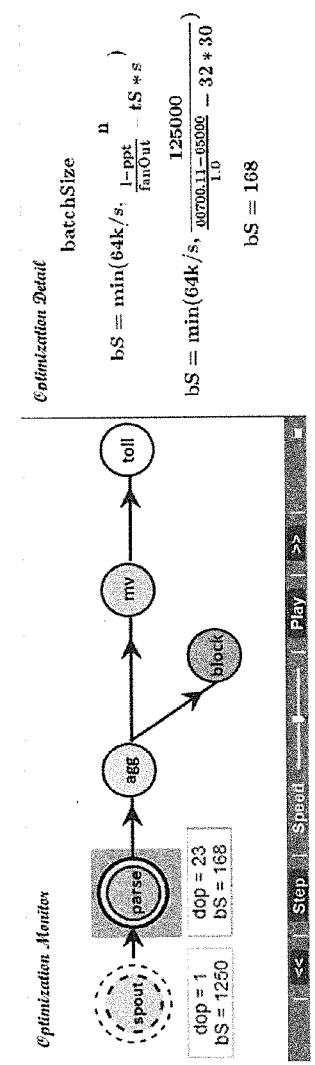

FIG. 2B shows another example of a screenshot for the user interface 104. A DAG can be submitted to the performance optimization system 101 and the user interface 104 shows how the parameter determination module 102 steps through the topology of the DAG and optimizes the topology node by node starting from source nodes and propagating parameter decisions from the producers to the consumers. In 'play' mode decisions made by the parameter determination module 102 may be visualized including its state, such as what node is currently being optimized, what are the parameter values of previously optimized nodes, and the formulas used for the optimization. The optimization can be stopped at any point allowing for a detailed explanation. FIG. 2B shows an optimization step of calculating the batch size of node 202. The currently processed node is highlighted and the formulas and the actual values are shown. The node 201 to the left (upstream) is already optimized and the parameter values for dop and batch size are displayed. The buttons on the bottom can be used to step forward and backward in the optimization process manually.

Through the user interface 104, a user may change the DAG, such as change nodes and parameters. Also, the user may define the dop and batch size for each node. A new DAG may also be created through the user interface 104.

Figure 3:
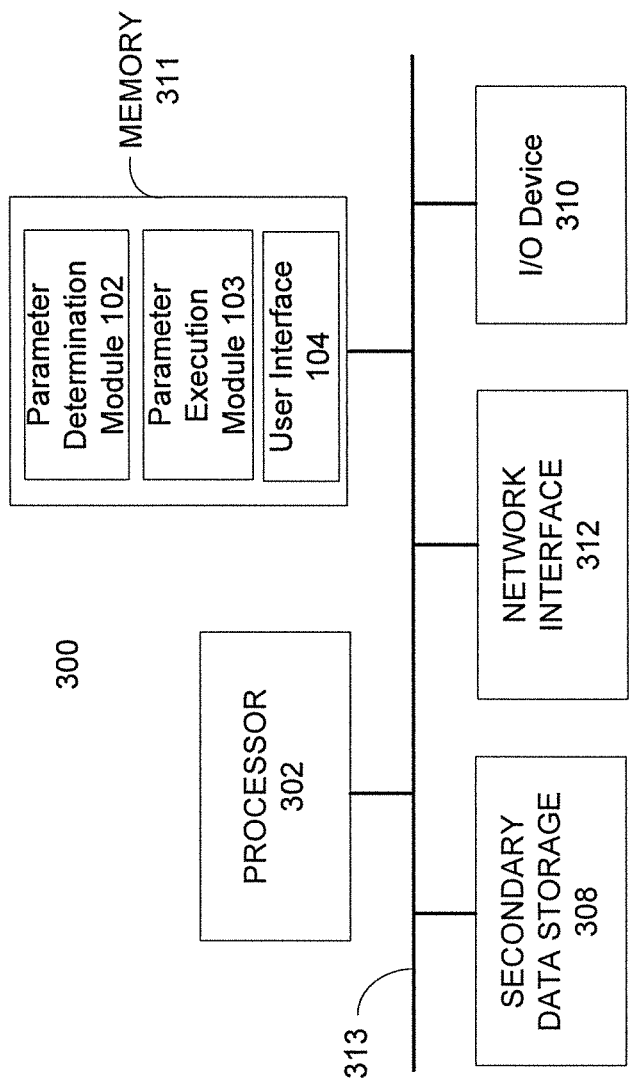
FIG. 3 illustrates a computer system that may be used as a platform for the system shown in FIG. 1.

FIG. 3 illustrates a computer system 300 that may be used as a platform for the performance optimization system 101. The computer system 300 may be a server or another computer system. The computer system 300 may execute, by one or more processors or other hardware processing circuits, The methods, functions and other processes described herein may be executed, by one or more processors or other hardware processing circuits in the computer system 300. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory in the computer system 300.

For example, the computer system 300 includes a processor 302 that may execute machine readable instructions performing some or all of the methods, functions and other processes described herein. Commands and data from the processor 302 are communicated over a communication bus 313. The computer system 300 also includes a main memory 311, such as a random access memory (RAM), where the machine readable instructions and data for the processor 302 may reside during runtime, and a secondary data storage 308, which may be non-volatile and stores machine readable instructions and data. For example, machine readable instructions for the parameter determination module 102, the parameter execution module 103 and the user interface 104 may reside in the memory 311 during runtime and may be stored in the secondary data storage 308. The memory 311 and secondary data storage 308 are examples of computer readable mediums.

The computer system 300 may include an I/O device 310, such as a keyboard, a mouse, a display, etc. For example, the I/O device 310 includes a display for the user interface 104 to display DAGs, runtime statistics, optimization information, etc. The user interface 104 may be a web interface that displays information on a different computer system, such as an end user device. The computer system 300 may include a network interface 312 for connecting to a network, such as the Internet. Other known electronic components may be added or substituted in the computer system 300. The performance optimization system 101 may be executed on a single computer system or on multiple computer systems, such as in a distributed computing environment Computing the optimal batch size and degree of parallelism (dop) for each node of a DAG for a dataflow may be performed by the parameter determination module 102 shown in FIG. 1. Some examples of definitions and terms to describe the optimization are now described.

Definition 1: A dataflow D=(V;E), is represented by a connected DAG comprising a set of nodes V and a set of edges E. E contains tuples $(v_i; v_j)$ where $v_i \in V$ and $v_j \in V$. Each node v in the graph has a label $dop_v$ that is a natural number describing the degree of parallelism the node has for execution. During execution, each node v executes many tasks in parallel according to its in $dop_v$. Each node in the DAG can emit tuples which are sent via the directed edges from a producer to a consumer.

Definition 2: If a task outputs tuples $t_1; \ldots, t_n$ while processing an input tuple t, then $t_1; \ldots, t_n$ are called child tuples of t. Each input tuple of any node may form a processing tree. The processing tree PT(t) of tuple t comprises t and all recursively emitted child tuples, i.e., all children of all child tuples and so on. Two time stamps may be determined for each tuple t: t.create and t.delete, whereby t.create indicates the time when the tuple is newly created and t.delete indicates the time when the tuple is deleted, i.e., completely processed.

The latency of a tuple is the time it takes to process its processing tree. Definition 3: Let PT(t) be the processing tree of tuple t. The latency l(t) of a tuple t is: l(t)=max(t'.delete|t'∈PT(t))−t.create. One objective of the parameter determination module 102 is to minimize the average latency for all incoming tuples. Let I be the set of all tuples emitted by all s∈S, where S is the set of source nodes having no incoming edges(S={s∈V|∄(v,s)∈E}). The optimization problem is defined as: min avg(l(t)|∀t ∈I). The optimization problem may be solved by the parameter determination module 102 implementing an optimization function described below according to an example.

The latency of a tuple is generally described above. Calculating the latency is now described according to an example. Two more time stamps may be determined for each tuple t: t.arrival and t.start. The arrival time stamp, t.arrival, indicates the time when the tuple arrives at the consumer (and is put in the consumer's input queue) and the start timestamp, t.start, is the time when the consumer starts to process the tuple. The pure processing time of a tuple within a node is the time for the node to process the tuple completely (t.delete−t.start). The queuing time is t.start−t.arrive and the shipping time is t.arrive−t.create. The actual processing time of t is shipping time+queuing time+pure processing time and is related to the latency of a tuple. To minimize the average latency of input tuples, the optimizing can minimize the average of the actual processing time for each node in the dataflow. The actual processing time for a tuple can be influenced by implementing parameters calculated by the parameter determination module 102. Increasing the dop is expected to reduce the average queuing time as more tuples get to be processed in parallel. Introducing batching is expected to increase the shipping time for individual tuples, but reduces the average shipping time because the fixed message overhead is shared over all tuples in a batch evenly. However, batching increases the average queuing time because all tuples of a batch are sent to the same consumer and are inserted into the consumer's input queue at once. To resolve this trade off, for each node, the minimum dop may be determined that minimizes the average of the actual processing time. If queuing time is zero, for example, as a result of the implementing the optimized dop, then actual processing time of t is shipping time+pure processing time. If pure processing time cannot be influenced, then shipping time may be minimized through batching and determining optimal batch size to minimize average latency.

An example is described below illustrating how the optimal producer batch size and consumer dop can be calculated. The dataflow in this example is the smallest (and simplest) possible dataflow consisting of a single source (with dop 1) and a single consumer. The calculation of batch size and dop illustrated by this example can be applied to larger dataflows.

The producer batch size may be chosen such that the producer output rate is maximized. The consumer dop may be chosen such that it is large enough to avoid overloading of the consumer. A node is overloaded if the pure processing time is too large when compared to the input arrival rate. In overload, the input queue will grow over time as tuples arrive faster than they can be processed.

Let r be the data arrival rate (in tuples per second) for the consumer and ppt be the consumer's pure processing time for a single tuple (in seconds). The optimal dop for the consumer is: $\min\{dop_c | dop_c > ppt \cdot r\}$.

The data arrival rate of the consumer is equal to the data output rate of the producer ($r_i(c) = r_o(p)$). The output rate may be in tuples per second. The input/output latency $l_i/l_o$ is the time between the arrival/transmission of two tuples, and may be calculated as the inverse of an input/output rate ($l_i = r_i^{-1}$). The data output rate of the producer may depend on multiple factors such as: (1) the data input rate of the producer, (2) the pure processing time of the producer, and (3) the shipping time to the consumer. Even a source has a data input rate because it fetches data externally. A source for example is the first producer in the DAG that does not receive tuples from another node in the DAG. The parameters may be calculated for different types of nodes in the DAG using the same function. However, sources often have a fixed dop of one, and the parameter determination module 102 may not calculate a dop for sources but instead may use a user-defined dop.

The shipping time can be calculated as n+t*s, where n is the fixed messaging network overhead in seconds, t is the average output tuple size in bytes, and s is the messaging data size overhead in seconds per byte. Given the example of a dataflow consisting of a single source (with dop 1) and a single consumer, the source output rate using no batching may be calculated as follows:

$$r_o = (\max\{l_i, ppt + n + t \cdot s\})^{-1}.$$

If $ppt + n + t \cdot s \leq l_i$, batching is not beneficial because the time for processing and transmitting an output tuple is smaller than the time until the next input tuple arrives (i.e., the source has to wait until it can fetch the next external input). However, if $ppt + n + t \cdot s > l_i$, the producer's output rate is limited by the pure processing and shipping time. In this case, reducing the average shipping time by batching increases the output rate, and the output rate with batching may be calculated as follows:

$$r_o = \frac{b}{\max\{b \cdot l_i, n + b \cdot (ppt + t \cdot s)\}}.$$

If batching with batching size b is implemented, b tuples can be transmitted in time $n + (b \cdot t \cdot s)$. The optimal batch size reduces the shipping time such that shipping plus pure processing time is smaller than $l_i$. In some cases, using a bigger batch size does not increase throughput anymore while increasing the latency. Therefore, the optimum batch size is calculated as $b \cdot l_i \geq n + b \cdot (ppt + t \cdot s)$:

$$\Leftrightarrow \min\left\{b \mid b \geq \left\{\frac{n}{l_i - ppt - (t \cdot s)}\right\}\right\}.$$

The average shipping time can be reduced by increasing batch size assuming that the shipping time is the dominant term. As long as n>>t·s and b is small, n dominates the cost. By increasing batch size b, n is reduced over the tuples.

In practice, the size of a batch may be limited by the underlying network hardware and transfer protocol so increasing the batch size may not always decrease average actual processing time. In the case of TCP/IP, the maximum useful batch size may be 64 KB, which is the maximum data size for a single TCP/IP package.

As discussed above, the optimum dop and batch size for a consumer may be based on consumer properties, producer properties (e.g., producer output rate), and some hardware dependent constants (e.g., n and s). However, there may be no dependency in the opposite direction. Therefore, the performance optimization system 101 can start to optimize a topology of a DAG beginning at the sources and propagating the decisions from the producers to the consumers throughout the whole topology. FIG. 4 shows an example of an optimization function that starts to optimize a topology of a DAG beginning at the sources and propagates the decisions from the producers to the consumers throughout the whole topology. The optimization function may be used by the performance optimization system 101 to determine dop and batch sizes to optimize a DAG.

The optimization function starts by maximizing the average output rate for a source in the first for-loop 401, and by computing the optimal batch size. For sources, user-defined dop sizes may be used. In the first for-loop 401, the function checks if batching can increase the output rate and calculates the optimal batch size accordingly. A maximum batch size $B_{max}$ may be enforced. For example, in the case of TCP/IP, the maximum useful batch size may be 64 KB. If the batch size b is greater than $B_{max}$ then b is set equal to $B_{max}$. Also, the dop of the producer p may be increased, which can in turn increase the input latency $I_i$ of the consumer. The output rate $r_o$ may be computed considering the dop of the producer.

After all the producers' batch sizes are computed, the dop for the consumers are computed in the second for loop 402. Consumers are those nodes for which the output rate of all corresponding producers are determined.

The optimization function in FIG. 4 iteratively optimizes a topology of a DAG beginning at the sources and propagates the decisions from the producers to the consumers throughout the whole topology. In a first iteration of the while-loop, the set of P nodes comprises the sources of the DAG that do not have an input edge. The batch size may be determined for the each source in the set P, and the dop may be determined for each consumer. Towards the end of the first iteration, all optimized consumers, which includes the consumers for which dop is determined in the previous iteration, are set to be producers p in the set P at 403. The while-loop is performed for the new set P of producers in a next iteration. The optimization function iterations terminate if no producers are left. This condition is met eventually, as the dataflow is a connected DAG, and the optimization function traverses the DAG following the directed edges beginning at the sources.

Figure 5:
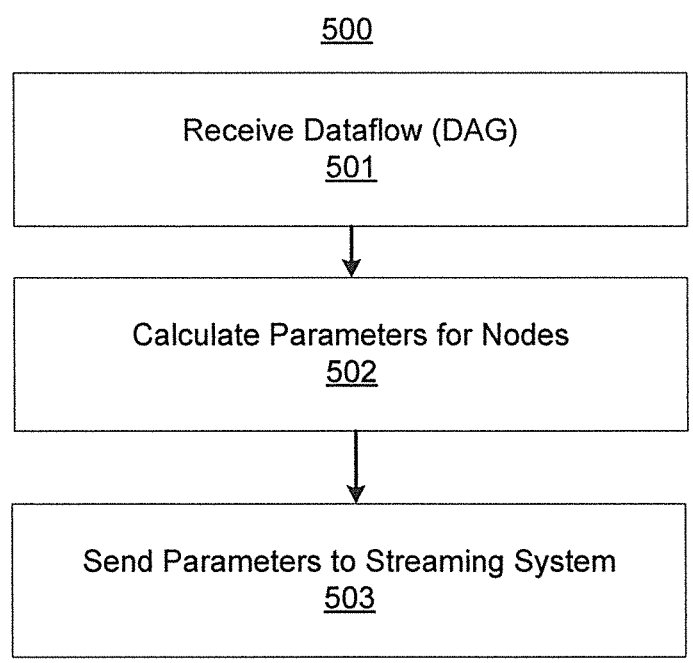
FIG. 5 illustrates a method.

FIG. 5 illustrates a method 500. The method 500 is described with respect to the performance optimization system 101 shown in FIG. 1 by way of example.

At 501, the performance optimization system 101 receives a dataflow DAG, such as the DAG for the dataflow 119, which may include nodes and edges connecting the nodes. Examples of DAGs are shown in FIGS. 2A-B. Tuples for the edges represent data transmitted between the nodes. The dataflow DAG represents the dataflow. In one example, the complete DAG may be received at the performance optimization system 101. In another example, the DAG is received via the user interface 104. For example, a user may create or modify a DAG through the user interface 104.

At 502, the performance optimization system 101 calculates parameters for the nodes. For example, the parameter determination module 102 calculates batch size and dop for the nodes to minimize latencies for the tuples. An example of calculating the parameters is shown in FIG. 4 and described with respect to the equations above. For example, batch sizes of producer nodes and dop of consumer nodes are calculated to increase system throughput.

A batching size may be calculated to increase the output rate (tuples per second) of the producer. For example, increasing the batch size (in the output) for a producer may be performed when the pure processing time plus the shipping time of a tuple is greater than an input latency at the producer. The input latency may be determined from the amount of time it takes to receive a tuple to be processed by the producer. If pure processing time cannot be influenced, batching size may be increased to minimize average shipping time for tuples. The optimized batch size may be calculated as a function of shipping time and pure processing time. Shipping time may be based on hardware dependent constants, such as fixed messaging network overhead, average output tuple size and messaging data size overhead.

The dop for consumers is calculated such that queuing time at the consumer is zero or as close as possible to zero. The optimized dop for a consumer should be large enough to avoid overloading the consumer. The optimized dop should be larger than the output rate of the producer sending tuples to the consumer multiplied by the pure processing time of the consumer. The output rate of the producer is equal to the input rate of the consumer for the tuples. If the batching size is increased, the dop may be increased to minimize queuing time of tuples received in the larger batches at the consumer.

At 503, the parameter determination module 102 of the performance optimization system 101 sends the optimized parameters to the parameter execution module 103 which sends the optimized DAG for the dataflow to the streaming system 120. The streaming system 120 sets the parameters for the dataflow DAG and executes the dataflow. The computers execute the tasks of the nodes of the dataflow. For example, input data, such as the data stream 130, is processed by the nodes of the dataflow to generate the data stream output 131.

While the embodiments have been described with reference to examples, various modifications to the described embodiments may be made without departing from the scope of the claimed embodiments.

What is claimed is:

1. A performance optimization system to optimize processing in a streaming system, the performance optimization system comprising:
    at least one processor;
    a data storage to store a dataflow directed acyclic graph comprising nodes and edges connecting the nodes, wherein the nodes process tuples and the edges send the tuples from one node to another node,
    wherein the nodes comprise producers generating the tuples and consumers receiving the tuples,
    a parameter determination module executed by the at least one processor, wherein for each node of the nodes the parameter determination module is to:

determine a parameter that includes a degree of parallelism (dop) for each of the consumers; and determine, for each of the producers, whether input latency of the tuples is smaller than a processing time of the tuples;

in response to a determination that input latency of the tuples is smaller than the processing time of the tuples, determine another parameter for the node that comprises a batch size; and in response to a determination that input latency of the tuples is not smaller than the processing time of the tuples, not determining the determining the batch size; and a parameter execution module to provide the parameters for the nodes to the streaming system, wherein the streaming system is to execute a dataflow for the dataflow directed acyclic graph according to the parameters for the nodes.

2. The performance optimization system according to claim 1, wherein to determine whether input latency of the tuples is smaller than the processing time of the tuples, the parameter determination module is to determine whether the input latency is smaller than a pure processing time plus a shipping time, and to calculate the batch size to reduce actual processing time by reducing the shipping time.

3. The performance optimization system according to claim 2, wherein the batch size is calculated based on the shipping time and the pure processing time.

4. The performance optimization system according to claim 1, wherein to calculate the parameters, the parameter determination module is to:

determine the dop for each of the consumers based on an output rate of tuples sent from a producer to the consumer and a pure processing time of the tuples at the consumer.

5. The performance optimization system according to claim 4, wherein the dop for each consumer is larger than the output rate multiplied by the pure processing time of the tuples at the consumer.

6. The performance optimization system according to claim 1, wherein to calculate the parameters for the nodes, the parameter determination module is to determine batch sizes for the producers based on shipping times, pure processing times, and input rates, wherein each shipping time is t.arrive−t.create, wherein t.arrive is a timestamp indicating a time when a tuple arrives at a consumer, and t.create is a timestamp indicating a time when the tuple is newly created at a producer sending the tuple to the consumer, each pure processing time is t.delete−t.start, wherein t.delete is a timestamp indicating when the tuple is deleted responsive to being completely processed at the consumer, and t.start is a timestamp indicating when the consumer starts processing the tuple, and each input rate of the input rates is equal to an output rate of the producer.

7. The performance optimization system according to claim 1, wherein the nodes comprise producers generating the tuples, consumers receiving the tuples, and at least one source node that is a producer which does not receive tuples from another node in the dataflow directed acyclic graph, and to calculate the parameter, the parameter determination module is to calculate the parameter starting at the at least source node and continue to calculate the parameter throughout a topology of the dataflow directed acyclic graph from the producers to the consumers, wherein the calculated parameters for the consumers are based on the calculated parameters for the producers.

8. The performance optimization system according to claim 1, comprising a user interface to display the dataflow and the parameters for the dataflow before and after optimizing the dataflow by the parameter determination module.

9. A non-transitory computer readable medium including machine readable instructions executable by a processor to:

receive a dataflow directed acyclic graph comprising nodes and edges connecting the nodes, wherein the nodes comprise producers and consumers processing tuples, and the edges send the tuples from the producers to the consumers;

calculate parameters for the nodes to minimize average latencies for the tuples, wherein the parameters include batch sizes for the producers and a degree of parallelism (dop) for each of the consumers, wherein the calculation of the dop for each consumer is based on an output rate of tuples sent from a producer to the consumer and a pure processing time of the tuples at the consumer, and wherein the dop for each consumer is larger than the output rate multiplied by the pure processing time of the consumer; and send the parameters to a streaming system to process a dataflow according to the parameters.

10. The non-transitory computer readable medium according to claim 9, wherein the instructions comprise instructions to determine whether batching is to be performed to reduce actual processing time by reducing shipping time.

11. The non-transitory computer readable medium according to claim 9, wherein the instructions comprise instructions to:

determine batch sizes for the producers based on shipping times, pure processing times and input rates, wherein each shipping time of the shipping times is t.arrive−t.create, wherein t.arrive is a timestamp indicating a time when a tuple arrives at a consumer, and t.create is a timestamp indicating a time when the tuple is newly created at a producer sending the tuple to the consumer, each pure processing time of the pure processing times is t.delete−t.start, wherein t.delete is a timestamp indicating when the tuple is deleted responsive to being completely processed at the consumer, and t.start is a timestamp indicating when the consumer starts processing the tuple, and each input rate of the input rates is equal to the output rate of the producer.

12. A method comprising:

receiving a dataflow directed acyclic graph comprising nodes and edges connecting the nodes, wherein the nodes comprise producers and consumers processing tuples, and the edges send the tuples from the producers to the consumers;

calculating parameters for the nodes to minimize average latencies for the tuples, wherein the parameters include batch sizes for the producers and a degree of parallelism (dop) for each of the consumers, wherein calculating the dop for each consumer is based on an output rate of tuples sent from a producer to the consumer and a pure processing time of the tuples at the consumer, and wherein the dop for each consumer is larger than the output rate multiplied by the pure processing time of the consumer; and sending the parameters to a streaming system to process a dataflow according to the parameters.

13. The method of claim 12, comprising:
determining batch sizes for the producers based on shipping times, pure processing times and input rates, wherein
each shipping time of the shipping times is t.arrive−t.create, wherein t.arrive is a timestamp indicating a time when a tuple arrives at a consumer, and t.create is a timestamp indicating a time when the tuple is newly created at a producer sending the tuple to the consumer,
each pure processing time of the pure processing times is t.delete−t.start, wherein t.delete is a timestamp indicating when the tuple is deleted responsive to being completely processed at the consumer, and t.start is a timestamp indicating when the consumer starts processing the tuple, and
each input rate of the input rates is equal to the output rate of the producer.

\* \* \* \* \*

UNITED STATES PATENT AND TRADEMARK OFFICE
CERTIFICATE OF CORRECTION

PATENT NO. : 9,081,870 B2  Page 1 of 1
APPLICATION NO. : 13/705952
DATED : July 14, 2015
INVENTOR(S) : Matthias Sax et al.

It is certified that error appears in the above-identified patent and that said Letters Patent is hereby corrected as shown below:

In The Claims

In column 8, line 64, in Claim 1, delete "tuples," and insert -- tuples; --, therefor.

In column 9, line 12 approx., in Claim 1, delete "determining the determining the" and insert -- determining the --, therefor.

Signed and Sealed this
Fifth Day of January, 2016

Michelle K. Lee
*Director of the United States Patent and Trademark Office*